E. EHLICH.
TIRE AND PUNCTUREPROOF PROTECTOR THEREFOR.
APPLICATION FILED MAR. 8, 1921.
1,420,979.
Patented June 27, 1922.
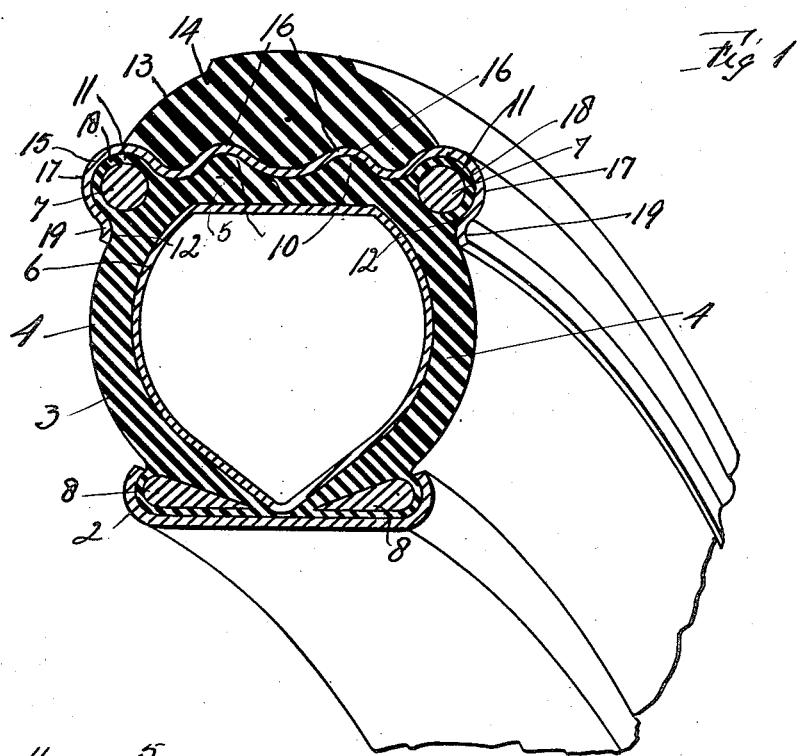
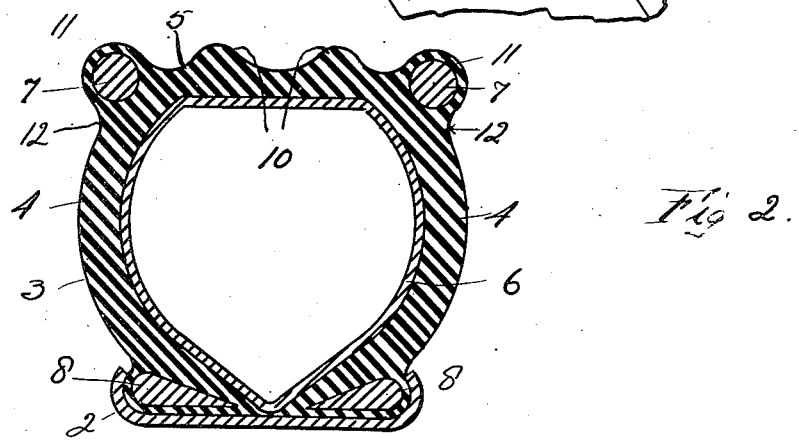
INVENTOR
Eugene Ehlich
By W. W. Williamson
Atty.

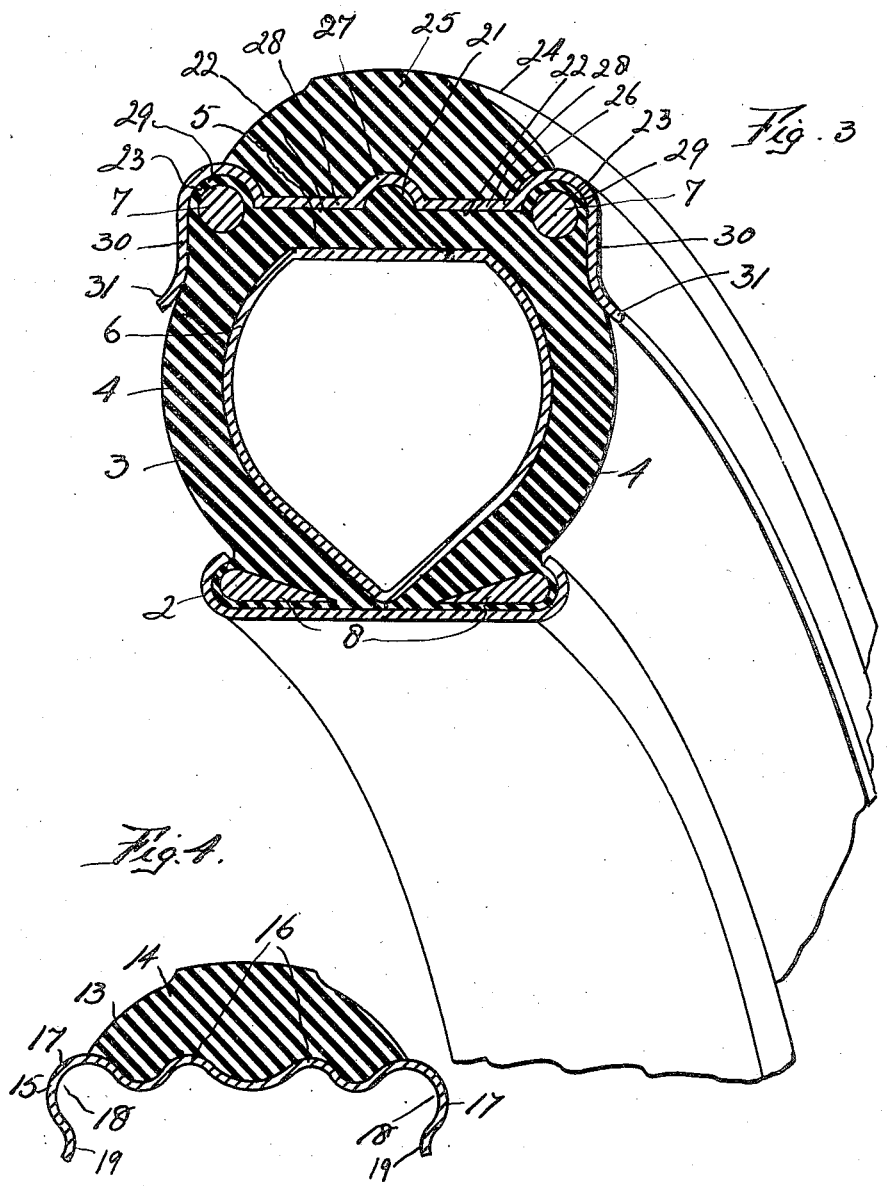

E. EHLICH.
TIRE AND PUNCTUREPROOF PROTECTOR THEREFOR.
APPLICATION FILED MAR. 8, 1921.

1,420,979.

Patented June 27, 1922.
3 SHEETS—SHEET 3.

INVENTOR
Eugene Ehlich
By W. W. Williamson, Atty.

UNITED STATES PATENT OFFICE.

EUGENE EHLICH, OF ENDICOTT, NEW YORK.

TIRE AND PUNCTUREPROOF PROTECTOR THEREFOR.

1,420,979.  Specification of Letters Patent.  Patented June 27, 1922.

Application filed March 8, 1921. Serial No. 450,558.

*To all whom it may concern:*

Be it known that I, EUGENE EHLICH, a citizen of the United States, residing at Endicott, in the county of Broome and State of New York, have invented new and useful Improvements in a Tire and Punctureproof Protector Therefor, of which the following is a specification.

My invention relates to new and useful improvements in an automobile tire and puncture proof protector therefor, and has for its object to construct a tire, having high elastic properties, in a unique form to receive a protector consisting of a stiff metallic band with a soft, solid rubber tread moulded thereon, the band being fashioned to snugly fit the shape of the tire, and when on the tire reduce to a minimum the likelihood of the tire being punctured.

Another object of the invention is to form an automobile outer tire or shoe of soft, pliable, elastic rubber without the use of textile or other fabrics particularly adapted to be used in conjunction with a protector so that said tire, through the medium of the air therein, will follow the protector in its movements relative to the wheel on which it is mounted whereby the protector will always be in contact with the outer surface or tread of the tire and giving the tire greater resiliency than is possible in tires of present day construction for the absorption of shocks incident to the obstructions encountered while traveling over a rough roadway.

Another object of the invention is to manufacture an outer tire or shoe, the walls of which are of soft, flexible and pliable solid rubber having embedded therein rings of semi-hard rubber, said rings preferably being four in number, one pair adjacent the inner circumference and the outer pair in proximity to the outer circumference or tread adjacent the side edges.

Still another object of the invention is to form the tire tread with circumferential corrugations of different shapes, sizes and configurations for the reception of a similarly fashioned or constructed protector whereby the latter will be prevented from lateral displacement or shifting relative to the tire on which it is mounted.

A further object of the invention is to provide a tire protector consisting of an annular metallic band or ring and a tread of soft solid rubber moulded thereon to prevent detachment, said band or ring having means to coact with the tire on which it is to be mounted to prevent displacement of the protector, said protector being capable of ready and quick application to or removal from the tire when the latter is deflated.

A still further object of the invention is to include in the formation of the protector, a metallic band or ring having circumferential corrugations or ribs and inturned side flanges for strengthening or stiffening the same to cause it to positively hold its annular shape.

Other objects of the invention will be ascertainable from the following detailed description of the different parts, their operation and relation to one another.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary sectional perspective view of an automobile tire and puncture proof protector therefor constructed in accordance with my invention.

Fig. 2, is a sectional view of this form of the tire without the protector.

Fig. 3, is a fragmentary sectional perspective view of another formation of tire and its protector.

Fig. 4, is a sectional view of one form of the protector removed from the tire.

Figure 5:
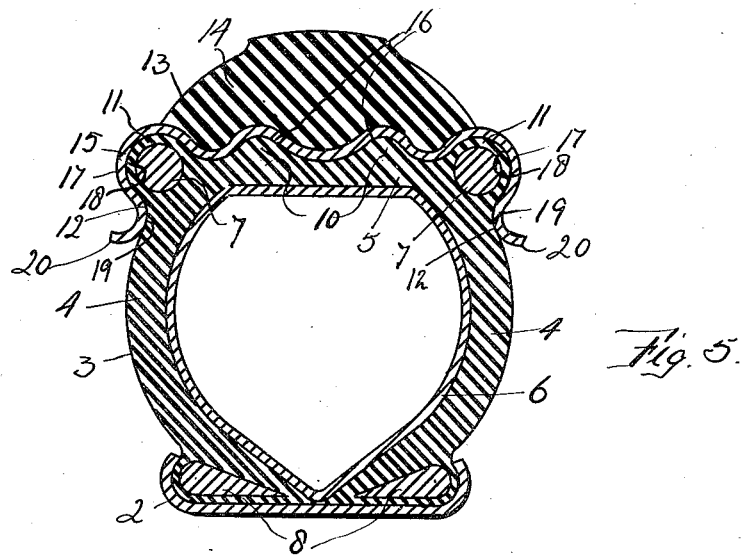
Fig. 5, is also a sectional view of the tire illustrated in Fig. 1 and its protector, the flanges of said protector band or ring being differently formed.

In carrying out my invention as here embodied, 2 represents a portion of a wheel, illustrated as a rim of the ordinary clincher type but which may be of any well known or desired construction, for the reception of my improved pneumatic tire 3. This tire is produced from soft, pliable rubber without textile or other fabrics so as to have considerably more elasticity than is possible in the ordinary or well known tires of present day construction, since the fabrics used in the latter limit their stretching qualities, which is essential to the proper operation of my improved tire in conjunction with the tire protector as will be more fully hereinafter explained.

The tire consists principally of the two side walls 4 and the tread wall 5 all of which, as hereinbefore stated, are formed of soft, pliable, elastic solid rubber and enclose the inner tube 6. In the region of the junctions of the side walls with the tread wall are embedded in the tire a pair of endless rings 7 of semi-hard rubber, circular in cross section while another pair of semi-hard rubber endless rings 8, elongated in cross section, are embedded in said side walls at their inner ends or adjacent the inner circumference of the tire in opposed positions and all of these semi-hard rubber rings assist in strengthening the tire in the localities of their positions and maintaining the same in proper shape.

As shown in Figs. 1, 2 and 5 the outer surface of the tread wall 5 of the tire is provided with annular corrugations or ribs 10 while at the side edges of the tire or at the points where the side walls join the tread wall are formed annular enlargements 11 portions of which are in alignment with the outermost surfaces of the side walls so that when the protector is in place portions thereof will overhang or project beyond said side walls. The annular enlargements produce channels 12 between them and the side walls.

The reference numeral 13 denotes the puncture proof protector consisting of a tread 14 of soft solid rubber and a metallic band or ring 15 upon which it is molded so as to be inseparable therefrom. The metallic band or ring is provided with annular corrugations 16 corresponding with the corrugations 10 on the tire with which they register and annular inturned flanges 17, portions of said band and its flanges being fashioned to form recesses 18 to receive the annular enlargements 11 on the tire. The flanges are provided with lips 19 to enter the channels 12 and clinch the protector on the tire which are located along the edges of the flanges as in Fig. 1, while as shown in Fig. 5 each of said flanges may be provided with an annular extension 20 projecting outwardly some distance from the surface of the side walls of the tire to prevent objects on the roadway coming in contact with the sides of the tire.

The corrugations, flanges and lips prevent sidewise displacement of the protector relative to the tire and also strengthen and stiffen the metallic band or ring to maintain its circular shape so that as the tire changes its shape or that portion thereof adjacent the roadbed changes its position relative to the hub of the wheel or in other words the distance between the protector and that part of the wheel nearest the roadbed is less than the distance between the protector and that part of the wheel diametrically opposite, while the distances between the protector and the other parts of the wheel between the two mentioned increases from the lower to the upper point.

Because of these varying distances it is essential that the tire have great pliable and elastic qualities and for this reason the tire must be produced from soft, pliable rubber without textile or similar fabrics.

Figure 6:
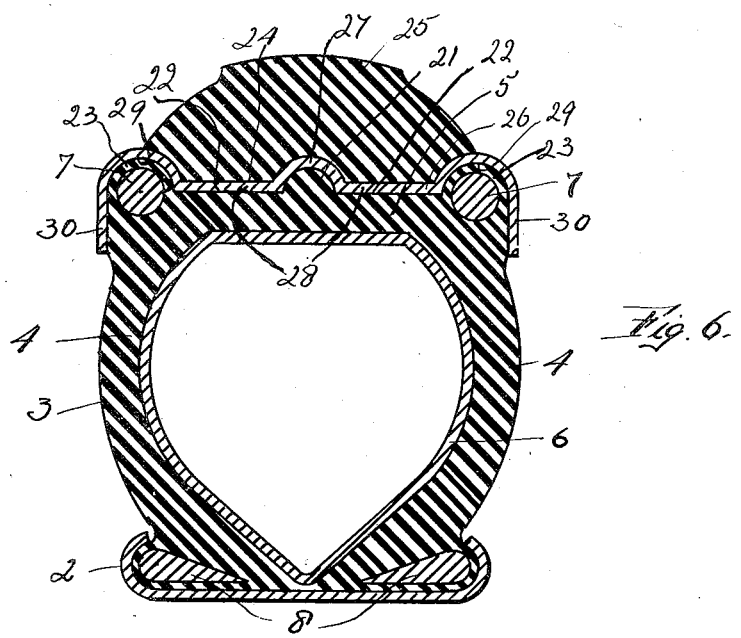
Fig. 6, is a similar view of the tire illustrated in Fig. 3 and its protector, showing a different formation of its flanges.

In Figs. 3 and 6, I have illustrated a slightly different formation of tire and protector in which the tire tread is provided with a single annular rib or corrugation 21 intermediate or midway the sides of the tire and this rib or corrugation is flanked on both sides by a flat section 22 the outer portions of these flat sections being bordered by the enlargements 23.

With this form of tire is used the protector 24 comprising the tread 25 of soft solid rubber, the same as described in the other formation, and the annular metallic band or ring 26 on which the tread is molded. The metallic band or ring is provided with a single annular rib or corrugation 27 midway the width thereof and flanked on both sides by a flat section 28. The outer edges of the flat sections 28 are bordered with arcuate portions forming annular recesses 29 from which project the annular inturned flanges 30 and these flanges may, if found desirable, be provided with the annular outwardly projecting extensions 31 as illustrated in Fig. 3 or said extensions may be dispensed with as shown in Fig. 6 and in the latter case the tire should be of such thickness or width as to lie within the confines of the protector band or ring as in Fig. 6. When the protector is placed upon the tire the corrugation 27 will align with the corrugation 21 and the flat sections 22, while the recesses 29 receive the enlargements 23 and the flanges engage the outer surfaces of the side walls. The configuration and arrangement of the different mentioned elements combine to hold the protector on the tire and prevent sidewise displacement thereof and at the same time strengthen and stiffen the metallic band or ring to keep it in its circular shape.

In practice the metallic band or ring must be formed from such metal that the corrugations, arcuate sections and flanges will strengthen and stiffen it sufficiently to cause it to maintain its circular shape while supporting a load within the limits of its capacity so that the protector will, when in use, assume a position eccentric to the wheel on which it is mounted.

In order to place the protector upon the tire, the latter is deflated and the protector properly positioned after which the tire is inflated and the latter being of soft, pliable, elastic rubber will always follow the position of the protector and add "life" or resiliency to the tire making it possible to efficiently and effectively absorb the shocks due to obstructions encountered on a roadway.

The metallic band, included as a part of the protector, overlying the tire prevents sharp objects penetrating the protector and puncturing the tire and since the outside edges or parts of the flanges overhang the outermost parts of the tire the same is protected against the likelihood of an object penetrating the side walls of the tire and to further overcome this possibility extensions projecting from the flanges may be used.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, the combination with a wheel of a tire consisting of side walls and a tread wall all of soft, pliable, elastic rubber and a metallic band removably mounted upon the tire and of sufficient thickness or strength to maintain its circular shape and thereby follow the eccentric positions assumed by the tire when supporting a load.

2. In a device of the character stated, the combination with a wheel of a tire consisting of side walls and a tread wall all of soft, pliable, elastic rubber, a metallic band removably mounted upon the tire and of sufficient thickness or strength to maintain its circular shape and thereby follow the eccentric positions assumed by the tire when supporting a load and a soft solid rubber tread molded on said band.

In testimony whereof, I have hereunto affixed my signature.

EUGENE EHLICH.